Aug. 4, 1964     R. W. BRONSON ETAL     3,142,886
METHOD OF MAKING GLASS ENCASED ELECTROLYTIC CAPACITOR
ASSEMBLY AND ARTICLE RESULTING THEREFROM
Filed Aug. 7, 1959

INVENTORS
Robert W. Bronson
Norman D. Korbitz
BY
Stevens, Davis, Miller & Mosher
ATTORNEYS United States Patent Office 3,142,886
Patented Aug. 4, 1964

3,142,886
METHOD OF MAKING GLASS ENCASED ELECTROLYTIC CAPACITOR ASSEMBLY AND ARTICLE RESULTING THEREFROM
Robert W. Bronson, Dallas, and Norman D. Korbitz, Richardson, Tex., assignors to Texas Instruments Incorporated, Dallas, Tex., a corporation of Delaware
Filed Aug. 7, 1959, Ser. No. 832,352
7 Claims. (Cl. 29—25.31)

This invention relates to solid electrolytic capacitors, and more particularly to electrolytic capacitors of the type which comprises a porous body of an anodizable metal, a dielectric film formed by anodization on the exposed surfaces of the porous body and an electrically conducting layer on the dielectric film. The invention is specifically concerned with a process for the glass encasement of such electrolytic capacitors and the hermetically sealed article resulting therefrom.

One object of this invention is to provide a unique solid state device totally encapsulated in a glass housing and having externally extending and ruggedly secured conductor leads hermetically sealed in the housing.

Another object is to provide a production process of encapsulating an electrical component in a hard glass case and hermetically sealing around its ohmic connector leads of tantalum and Kovar.

A further object is to provide a high speed production method of making hermetically sealed capacitors.

And another object is to provide an improved method of producing durable capacitor assemblies which is more economical than methods involving soldering techniques.

An additional object is to provide a very reliable method of producing hermetically sealed capacitor assemblies by employing a glass-to-glass seal during the final closure operation.

A still further object is to provide a method of sealing a capacitor body within a glass case having a completely sealed lower end by reducing the pressure at the upper end simultaneously with the application of heat to permit the molten glass to be drawn inward and permit air bubbles to be drawn from the glass to form a hermetic seal at the upper end.

And yet another object is to provide a method of sealing an electrical component having a protruding lead wire into an open ended glass case by applying a direct flame to the open end of the case until the glass is molten and applying a jet of cool air to the case below the heated section to assist the flame in causing the molten upper end of the case to be drawn inward and sealed around the protruding lead wire.

An additional object is to provide a method of encapsulating a capacitor in a glass housing in such a way that heat may be employed to hermetically seal the housing without damage to the functional portion of the capacitor.

And another object is to provide a production process for hermetically sealing electrical components in a glass housing which employs a rotating glass housing and the combination of a directional flame to force the molten glass inward and an air jet to cool the interior of the housing and reduce the internal pressure while the flame is forming a closure.

These and other objects and advantages will be apparent from an examination of the following specification and drawing in which.

Figure 6:
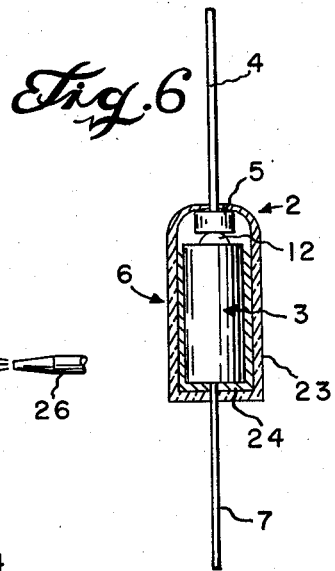
FIGURE 6 is a cross-sectional view of the completed electrical component assembly made by the process of this invention.

Referring now more particularly to the drawing, it will be observed in FIGURE 6 that the complete capacitor assembly of this invention, identified generally at 2, consists basically of an electrical component 3, including a lead wire 4, a glass-sealing bead 5, and a glass-housing unit 6 including a lead wire 7, which encapsulates and hermetically seals off the component 3.

Figure 1:
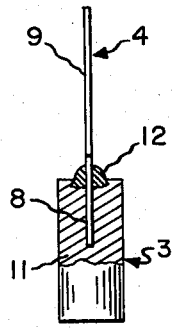
FIGURE 1 is a side elevational view partly in section, of a solid tantalum pellet used by way of example in describing the process of this invention.

The assembly 2 shown in FIGURE 6 is made from the detail parts and by the process steps shown in FIGURES 1–5. In one embodiment, which will be described by way of example, the assembly 2 is a tantalum capacitor assembly and the component 3 is a solid tantalum pellet which has been treated to function as a capacitor. In FIGURE 1, the lead wire 4 is seen to be composed of two integrally joined sections of wire 8 and 9. The short section 8 is composed of tantalum to permit its being integrally joined with the tantalum metal of the sintered tantalum blank 11 of FIGURE 1, while the long section 9 is composed of Kovar metal to permit its being integrally joined with the glass bead 5. "Kovar" is a trade name for an alloy of nickel, iron and cobalt which, after production, retains a thin oxide film on its surface.

The tantalum pellet 3 may be made by the process shown in copending application of Norman D. Korbitz, Serial No. 832,384, filed on the same date as the instant application and entitled "Capacitor Pellet and Method of Making Same" and the disclosure of this copending application is incorporated into this specification by reference. While tantalum may be used for the preferred embodiment in the pellet 3, other film-forming metals, such as aluminum, tungsten, niobium, hafnium, titanium, or zirconium, may also be employed.

By way of description this process consists briefly of placing a glass bead 12 over the tantalum portion 8 of the lead wire 4 and heat fusing the bead to the top surface of the pellet 3 and simultaneously to the tantalum section 8 of the wire 4.

Figure 2:
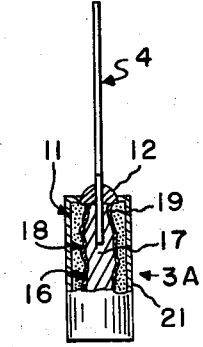
FIGURE 2 shows the electrical component made from the pellet of FIG. 1 which will be hermetically sealed by the process of this invention to form an electrical component assembly.

After the tantalum pellet 3 is obtained, it is subjected to a prior art process to convert it to the solid tantalum capacitor, identified at 3A in FIGURE 2. This process electrochemically forms a film 16 of dielectric material, tantalum pentoxide, on the interfaces of the sintered tantalum 17 in the blank 11. A thickness of manganese dioxide 18 is then deposited over the tantalum peroxide film 16, and thereafter conductive coatings of graphite 19 and copper 21 are applied to the blank to form a conducting bond for the second lead wire 7. The construction described produces a capacitor, as seen in FIGURE 2, wherein the tantalum metal 17 becomes one plate, the manganese dioxide 18 acts as a dry electrolyte, the other plate being the graphite and copper coatings, and the tantalum pentoxide 16 becomes a dielectric between the plates. This process thus changes the tantalum pellet 3 into a capacitor blank unit 3A. The use of the glass bead 12 has an additional advantage to its primary function of providing a durable connection in that it will positively prevent the graphite and copper coatings 19 and 21 from coming into contact with the lead wire 4 and forming a short circuit.

Figure 3:
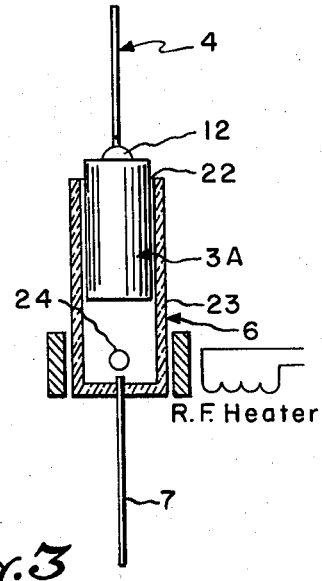
FIGURE 3 is a cross-sectional elevational view illustrating the process step of inserting the component of FIG. 1 into an open ended glass housing.
Figure 4:
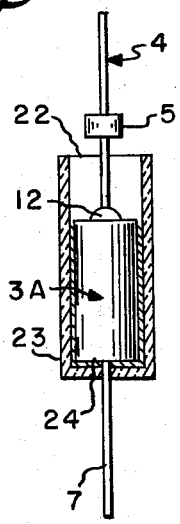
FIGURE 4 shows the component of this invention after the process step of soldering the component of FIG. 2 to the housing of FIG. 3 has been completed.

Upon completion of the above process, the capacitor blank unit 3A of FIGURE 2 is inserted through the open end 22 of a glass housing unit 6, as shown in FIGURE 3. The housing unit 6 includes a cup-shaped hollow shell 23 of hard glass of the borosilicate type, known in the trade as Corning Glass Co. No. 7052, into and through the bottom of which the lead wire 7 has been inserted hermetically bonded. Just prior to insertion of the capacitor blank unit 3A, a drop of solder 24 is placed in the bottom of the housing unit 6, as shown in FIGURE 3, and upon sufficient heating (again by RF coils), the solder melts and flows around the circumference of the blank unit 3A, as seen in FIGURE 4. This forms a good ohmic contact between one "plate" of the capacitor and lead wire 7; the plate in this instance being the copper and graphite coatings.

Figure 5:
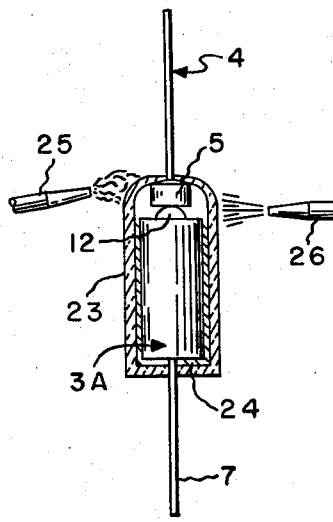
FIGURE 5 shows the device of FIG. 4 being subjected to the process step of sealing the open end of the glass housing about the component and its lead wire.

The next step in this process is the insertion of a second glass bead 5 over the lead wire 4, as shown in FIGURE 4, so that it comes to rest on top of glass bead 12. Thereafter, a jet-type flame heater 25 is placed in closed proximity to the outer circumference of the glass shell 23 near its open end 22 and the jet heater 25 is placed at the precise angular position to cause the glass to move inward under the pressure of the flame as the upper part of the shell 23 begins to soften. At ths point, a jet of cool air from nozzle 26 is directed against the outside of shell 23 just below the heated area. This action cools and contracts the gases inside the shell 23 as the top opening becomes more and more restricted, external pressure then acting to bend the molten glass toward the lead 4, as shown in FIGURE 5. The glass then fuses to the lead wire 4 and simultaneously to the sealing bead 5, which is also in a molten state at this point to produce the product shown in FIGURE 6. During this combined heating and cooling operation the assembly 2 is rotated at approximately 3 revolutions in 7 seconds to insure uniformity of the fusion. The timing and point of application of the cold air jet operation are very important, as is the rate of cooling it imparts. The air jet from nozzle 26 is turned on just after the glass 23 has reached a pliable or slightly molten state, is applied just below the point of application of the heat from the heater 25, and must be applied at a sufficient velocity so that the cooling effect imparted to the gases inside of the shell 23 is greater than the heating effect on the gases due to the heater 25. This critical relationship will prevent air bubbles from forming in the glass wall, and the lowered internal pressure will pull shut any pin holes, and will insure a hermetic seal between the glass shell 23 and the lead wire 4, as well as between the sealing glass bead 5 and shell 23.

By employing the jet flame heater 25 in place of the RF coils and a carbon ring, or other non-contact type heater, the time required to fuse the glass may be reduced from 10 seconds to about 3 seconds, and in this operation the definite advantage is gained of utilizing the pressure of the jet flame to facilitate the encapsulating closing of the molten glass about the lead wire 4 and glass bead 5. During both the heating stage and the subsequent cooling off stage, the Kovar wire 4 expands and contracts uniformly with the glass due to their similar expansion rates. Another advantage of using a Kovar wire in this instance is the fact that it includes an oxide coating to which the molten glass bonds to form a hermetic seal which is superior to the seal of glass to an ordinary bare metal surface. An inert internal atmosphere is desirable since the tantalum has a high tendency toward oxidation, and oxidation of the tantalum might be detrimental to the electrical characteristics of the capacitor. Thus the flame of heater 25 is maintained neutral or reducing in contrast with an ordinary flame which is oxidizing.

Another unique characteristic and result of this process is that the internal gases of the shell 23 during the final heat sealing operation are cooled by the air jet to a point below the oxidizing temperature until the hermetic seal is completed. Additionally, the initial heating by the flame expands the internal gases and the venturi action of the jet tends to draw the gases out of the shell 23, so that the net result of the foregoing effects is to provide a trouble-free process of hermetically encapsulating an electrical component in a glass housing without the undesirable oxidization which is usually present unless an inert ambient atmosphere is employed.

Although certain specific embodiments of the invention have been shown and described, it is obvious that many modifications thereof are possible. The invention, therefore, is not to be restricted except insofar as is necessitated by the prior art and by the scope of the appended claims.

In an alternate form of the invention, "Dumet," which is the trade name for a nickel-iron-alloy wire having a copper coating may be used instead of Kovar for the lead wire, while a soft glass such as Corning Glass Works No. G–12 may be substituted for the hard glass No. 7052.

What is claimed is:

1. A method for making a glass encased electrolytic capacitor having a capacitor blank which includes a porous body of an anodizable metal, a dielectric film on the exposed surfaces of said porous body, an electrically conductive layer on said dielectric film, a lead wire attached to the capacitor blank, and a glass bead fused to the junction of the lead wire and the blank, said method comprising the steps of inserting said capacitor blank into a glass casing having an open end and a closed end to which a second lead wire has been attached, soldering said second lead wire to said capacitor blank, placing a second glass bead over said first-mentioned lead wire so that it rests on the fused glass bead, heating said glass casing in the vicinity of its open end to fuse the glass and form a seal about said first-mentioned lead wire and to the second glass bead.

2. A method for making a glass encased electrolytic capacitor as set forth in claim 1 wherein a cool air blast is applied to said glass casing below the open end during the operation of heating the glass casing in the vicinity of its open end.

3. A method of making hermetically sealed capacitor assemblies comprising the steps of: inserting a metallic lead into a metallic capacitor blank, fusing a glass bead to the junction of said lead and blank, applying a conductive coating to the exterior of said unit, inserting a lead through the closed end of a cup-shaped glass housing, placing a spot of solder in the bottom of said housing and adjacent said last named lead, inserting said blank into the open end of said housing and onto said solder, heating said solder to form an ohmic connection between said last-named lead and said conductive coating, placing a glass bead over said first named lead and in contact with said first-named bead, and fusing the open end of said housing to said last-named bead and first-named lead.

4. A method of making glass sealed capacitor assemblies comprising the steps of: attaching a lead to a capacitor blank, attaching a lead to the closed end of a cup-shaped glass housing, inserting said blank into said housing, heating the open end of said housing to the fusing point of glass and applying a jet of cool air just below the point of application of the heat to shrink the atmosphere within the housing and permit the area of the open end to move into fusing contact with said first-named lead.

5. A method of making glass sealed capacitor assemblies comprising the steps of: attaching a lead to a capacitor blank, attaching a lead to the closed end of a cup-shaped glass housing, inserting said blank into said housing, heating the open end of said housing by induction means to the fusing point of glass and applying a jet of cool air just below the point of application of the heat to shrink the atmosphere within the housing and permit the area of the open end to move into fusing contact with said first-named lead.

6. A method of making glass sealed capacitor assemblies comprising the steps of: attaching a lead to a capacitor blank by fusing a glass bead into the junction of said lead and blank, attaching a lead to the closed end of a cup-shaped glass housing, inserting said blank into said housing, heating the open end of said housing to the fusing point of glass and applying a jet of cool air just below the point of application of the heat to shrink the atmosphere within the housing and permit the area of the open end to move into fusing contact with said first-named lead.

7. A method of making glass sealed capacitor assemblies comprising the steps of: attaching a lead to a capacitor blank, attaching a lead to the closed end of a cup-shaped glass housing, placing a spot of solder in the bottom of said cup-shaped housing and heating said solder by induction to attach said blank to said last-named lead, inserting said blank into said housing, heating the open end of said housing to the fusing point of glass and applying a jet of cool air just below the point of application of the heat to shrink the atmosphere within the housing and permit the area of the open end to move into fusing contact with said first-named lead.

References Cited in the file of this patent

UNITED STATES PATENTS

| | | |
|---|---|---|
| 2,177,685 | Bol | Oct. 31, 1939 |
| 2,283,823 | Clark | May 19, 1942 |
| 2,299,228 | Gray | Oct. 20, 1942 |
| 2,299,667 | Waterman | Oct. 20, 1942 |
| 2,675,497 | Meister | Apr. 13, 1954 |
| 2,694,168 | North et al. | Nov. 9, 1954 |
| 2,862,155 | Bubriski | Nov. 25, 1958 |
| 2,896,134 | Myer | July 21, 1959 |
| 2,936,514 | Millard | May 17, 1960 |

FOREIGN PATENTS

| | | |
|---|---|---|
| 154,136 | Germany | Sept. 4, 1903 |
| 160,620 | Australia | Feb. 4, 1954 |